(12) United States Patent
Geiselhart et al.

(10) Patent No.: US 11,474,989 B2
(45) Date of Patent: Oct. 18, 2022

(54) ONLINE REORGANIZATION OF DATABASE TABLES WITH CONCURRENT UPDATES

(71) Applicant: International Business Machines Corporation, Armonk, NY (US)

(72) Inventors: Reinhold Geiselhart, Rottenburg-Ergenzingen (DE); Felix Beier, Haigerloch (DE); Knut Stolze, Hummelshain (DE); Luis Eduardo Oliveira Lizardo, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 17/015,649

(22) Filed: Sep. 9, 2020

(65) Prior Publication Data

US 2022/0075768 A1 Mar. 10, 2022

(51) Int. Cl.
*G06F 16/22* (2019.01)
*G06F 16/2455* (2019.01)
*G06F 16/23* (2019.01)
*G06F 16/27* (2019.01)

(52) U.S. Cl.
CPC ...... *G06F 16/2282* (2019.01); *G06F 16/2386* (2019.01); *G06F 16/24553* (2019.01); *G06F 16/275* (2019.01)

(58) Field of Classification Search
CPC .......... G06F 16/2282; G06F 16/2386
USPC ....................................... 707/803
See application file for complete search history.

(56) References Cited

U.S. PATENT DOCUMENTS

| | | | |
|---|---|---|---|
| 6,343,296 B1 | 1/2002 | Lakhamraju | |
| 6,950,834 B2* | 9/2005 | Huras | G06F 16/2343 707/999.102 |
| 6,965,899 B1* | 11/2005 | Subramaniam | G06F 16/2282 707/999.102 |
| 7,269,595 B1 | 9/2007 | Loboz | |
| 9,075,858 B2 | 7/2015 | Andre | |
| 10,289,723 B1* | 5/2019 | Cai | G06F 16/2453 |
| 2009/0319581 A1 | 12/2009 | Seifert | |
| 2012/0272232 A1 | 10/2012 | Song | |
| 2012/0290588 A1* | 11/2012 | Egan | G06F 16/2282 707/752 |
| 2018/0032562 A1 | 2/2018 | Taylor | |
| 2020/0142987 A1 | 5/2020 | Grabs | |
| 2021/0149915 A1* | 5/2021 | Lee | G06F 16/273 |

OTHER PUBLICATIONS

Anonymous et al., "Multiple granularity locking", Wikipedia, United States, May 11, 2020, 2 Pages.
(Continued)

*Primary Examiner* — Muluemebet Gurmu
(74) *Attorney, Agent, or Firm* — Erika R. DeCosty

(57) ABSTRACT

In an approach to online reorganization of database tables with concurrent updates, a second table is created, where the second table has the same schema as the first table. A union of the first table and the second table is projected to create a view, where the view allows table data to be queried and modified while the database table reorganization is performed. Responsive to one or more running replication transactions completing, the database table reorganization is executed. Responsive to receiving a query, the query is allowed to access the view.

20 Claims, 4 Drawing Sheets

(56) References Cited

OTHER PUBLICATIONS

Anonymous et al., "Reorg Table Space", IBM Knowledge Center, 6 Pages.
Salzberg et al., "Principles of Transaction-Based On-Line Reorganization", Proceedings of the 18th VLDB Conference, Vancouver, British Columbia, Canada, 1992, 10 Pages.
Sockut et al., "A method for on-line reorganization of a database", in IBM Systems Journal, vol. 36, No. 3, pp. 411-436, doi: 10.1147/sj.363.0411, 1997, 26 Pages.
Wang et al., "Improving Performance of Parallel Transaction Processing Systems by Balancing Data Load on Line", Proceedings Seventh International Conference on Parallel and Distributed Systems (Cat. No. PR00568), Iwate, pp. 331-338, doi: 10.1109/ICPADS.2000.857715, Japan, 2000, 8 Pages.

\* cited by examiner

ONLINE REORGANIZATION OF DATABASE TABLES WITH CONCURRENT UPDATES

BACKGROUND

The present invention relates generally to the field of database partitioning, and more particularly to online reorganization of database tables with concurrent updates.

Database partitioning helps a database administrator to adapt to data growth by providing a way to expand the capacity of the system and scale for performance. A distribution key is a column (or group of columns) that is used to determine the database partition in which a particular row of data is stored. Choosing a good distribution key is important to spread the data evenly across all database partitions in the database partition group.

Columns having the highest cardinality or unique keys are good candidates for distribution keys. Columns with uneven data distribution, with a small number of distinct values, or those which are updated frequently might result in skew, where query processing involves more work on a subset of database partitions and less work on others. Furthermore, partitions can be added or removed within the database environment resulting in an unbalanced system.

There are other complex situations, however, where a major reorganization of the database is required to ensure that the database remains relevant and useful. In these scenarios, data can be redistributed or reorganized by moving it within a partitioned database environment. The goal of the data redistribution operation is typically to balance the usage of storage space, improve database system performance, or satisfy other system requirements.

SUMMARY

Embodiments of the present invention disclose a method, a computer program product, and a system for online reorganization of database tables with concurrent updates. In one embodiment, a second table is created, where the second table has the same schema as the first table. A union of the first table and the second table is projected to create a view, where the view allows table data to be queried and modified while the database table reorganization is performed. Responsive to one or more running replication transactions completing, the database table reorganization is executed. Responsive to receiving a query, the query is allowed to access the view.

DETAILED DESCRIPTION

The data reorganization/redistribution operation affects an entire table and requires the table to be recreated. Problems arise during this process if there are concurrent workloads running, such as queries or changes, which can include inserts, deletions, and update splits.

Presently, database management systems do not support internal reorganization with proper synchronization of concurrent workloads. To ensure that data integrity is maintained, these systems usually require that the table be quiesced, i.e., all concurrent accesses locked out, before starting the reorganization/redistribution operation. Alternatively, the reorganization process creates reorganized shadow objects and atomically switches them with the original objects after the reorganization process completes. Concurrent changes are separately collected and are applied to the shadow objects during the switching phase, which—again—requires lock protection. This "downtime" should be preferably minimized, as many companies cannot effectively function when part of their database is not accessible.

The present invention is a solution to allow for concurrent queries and updates during data reorganization/redistribution operations. In an embodiment, the present invention performs a reorganization on a table-based SQL database. In this embodiment, it will not be necessary to quiesce the entire table, but only individual rows. The present invention creates a second table, with same schema, but with the new distribution/organization keys applied. In addition, other reorganization operations are not excluded. Next, the data is copied, row by row, from the old table to the new table.

During this process, incoming queries access a view, created from a union projection of both tables. The union command combines the result set of two or more select statements with only distinct rows, i.e., potential duplicate rows caused by the intermediate copy are suppressed. In this way, rows that were already copied to the second table will only appear once in the view.

In another embodiment, the present invention performs a reorganization on a collection-of-documents-based NOSQL database. In this embodiment, an aggregation over collections would be the equivalent of the union in the SQL embodiment, and a stored aggregation of collections would be the equivalent of the view in the SQL embodiment.

The following description will use the SQL terminology. However, the NOSQL terminology can be substituted into the following description with no loss of functionality.

During the reorganization process it is preferable not to block concurrent operations since the data reorganization typically takes a significant amount of time. Queries on the data being reorganized can start at any point in time, i.e. before the reorganization starts, while it is running, or after it has finished. Queries can run for even longer than the reorganization takes. The present invention handles all three of these cases.

Figure 1:
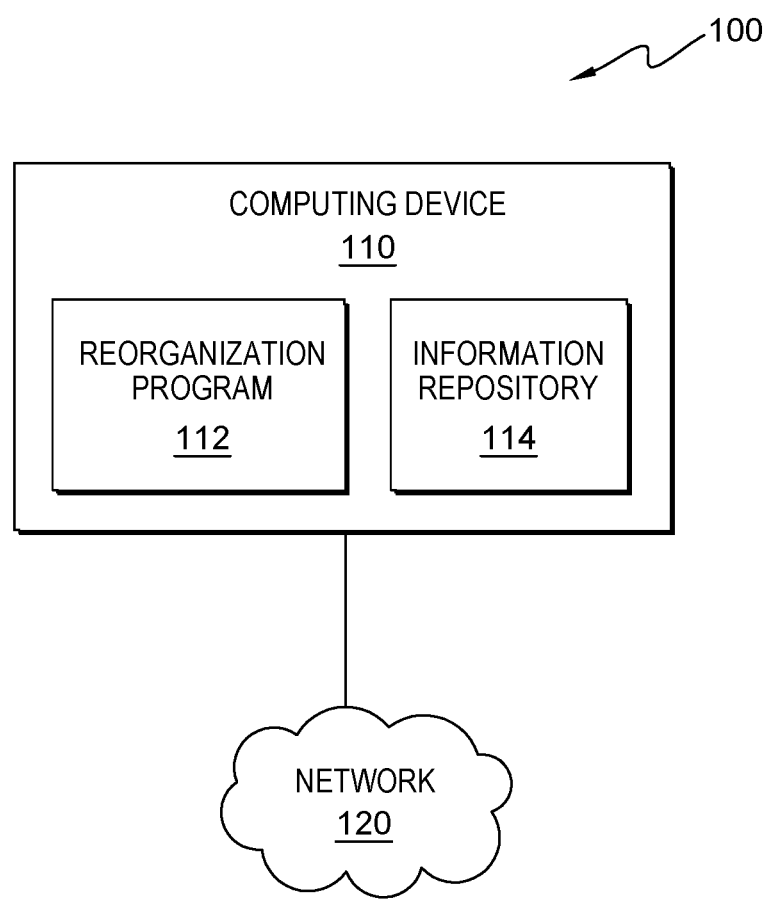
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of reorganization program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes reorganization program 112. In an embodiment, reorganization program 112 is a program, application, or subprogram of a larger program for online reorganization of database tables with concurrent updates. In an alternative embodiment, reorganization program 112 may be located on any other device accessible by computing device 110 via network 120.

In an embodiment, computing device 110 includes information repository 114. In an embodiment, information repository 114 may be managed by reorganization program 112. In an alternate embodiment, information repository 114 may be managed by the operating system of the device, alone, or together with, reorganization program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, database data, query data, partition data, reorganization configuration data, replication data, system data, user data, and other data that is received by reorganization program 112 from one or more sources, and data that is created by reorganization program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more tables.

Figure 2:
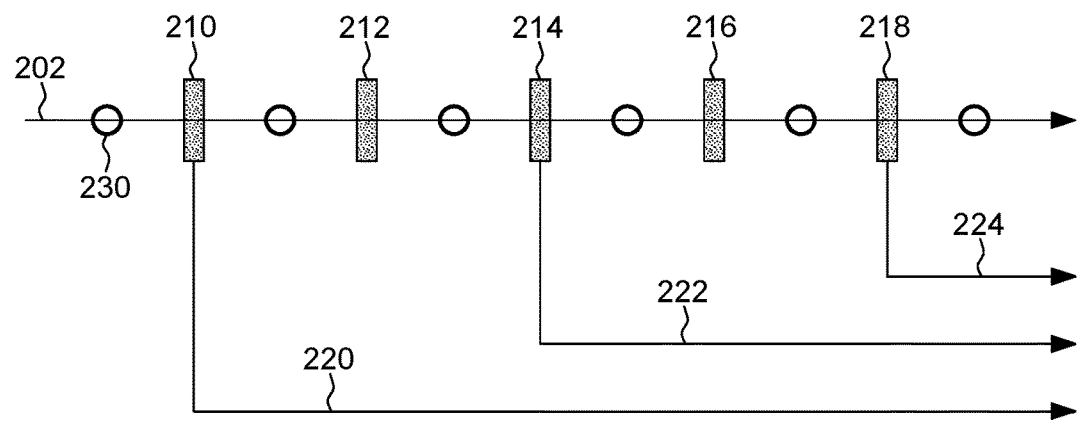
FIG. 2 is an example of a timeline of multiple queries into a database while a reorganization is being performed, in accordance with an embodiment of the present invention.

FIG. 2 is an example of a timeline of multiple queries into a database while a reorganization is being performed by reorganization program 112. The example in FIG. 2 illustrates that queries on the data being reorganized can start at any point in time, i.e., before the reorganization starts, while it is running, or after it has finished. This example include timeline 202, which is the timeline for the reorganization process. In this example, the data reorganization starts at time 212 and completes at time 216. During the reorganization process it is preferable not to block concurrent operations since the data reorganization typically takes a significant amount of time. Those queries can run for a time that is longer than the reorganization takes. In the example of FIG. 2, a query Q1 starts at time 210, which is before the data reorganization starts, but completes after the data reorganization has completed, as shown in Q1 timeline 220. Query Q1 is not aware of any views or other objects created by the reorganization itself, so all data that the query accesses has to be available as long as the query is running, i.e., the query cannot be redirected to a new table while the query is running.

In this example, query Q2 starts operating on an intermediate state of the objects that is being used to accommodate the data reorganization itself. In this example, query Q2 starts at time 214, which is after the reorganization has started, and completes after the data reorganization has completed, as shown in Q2 timeline 222. For query Q3, the fact that a reorganization did happen does not matter anymore. Query Q3 starts at time 218, as shown in Q3 timeline 224, which is after the reorganization has completed, and therefore is unaffected by the reorganization, as query Q3 runs only on the new table created by reorganization program 112.

Concurrent data modifications 230 illustrate where various database modifications, e.g., replications, take place during the timeline illustrated in this example.

Note that if a query accesses a view, that view is resolved and compiled into the query when the query starts. Subsequently, the query only accesses the underlying objects and uses the predicates as they were in the view when the query started. Thus, subsequent changes to the view definition do not have any effect on an already running query.

Figure 3:
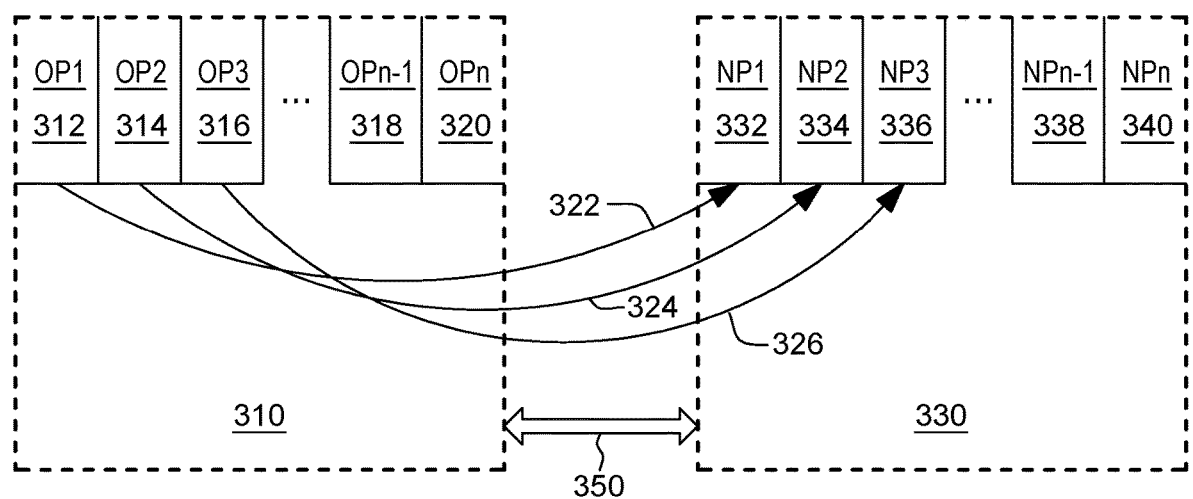
FIG. 3 is an example of a reorganization process, in accordance with an embodiment of the present invention.

FIG. 3 is an example of a reorganization process that is being performed by reorganization program 112. In this example, each old partition in old table 310, including OP1 312, OP2 314, OP3 316, OPn-1 318, and OPn 320, is copied to the corresponding new partition in new table 330, including NP1 332, NP2 334, NP3 336, NPn-1 338, and NPn 340, by reorganization program 112. In this example, reorganization program 112 copies the data from old partition OP1 312 to new partition NP1 332 in copy step_1 322; from old partition OP2 314 to new partition NP2 334 in copy step_2 324; and from old partition OP3 316 to new partition NP3336 in copy step_3 326. During the reorganization process, reorganization program 112 creates union view 350 from the union projection of both the old and new tables that allows incoming queries to access a union of both tables during the reorganization process.

Figure 4:
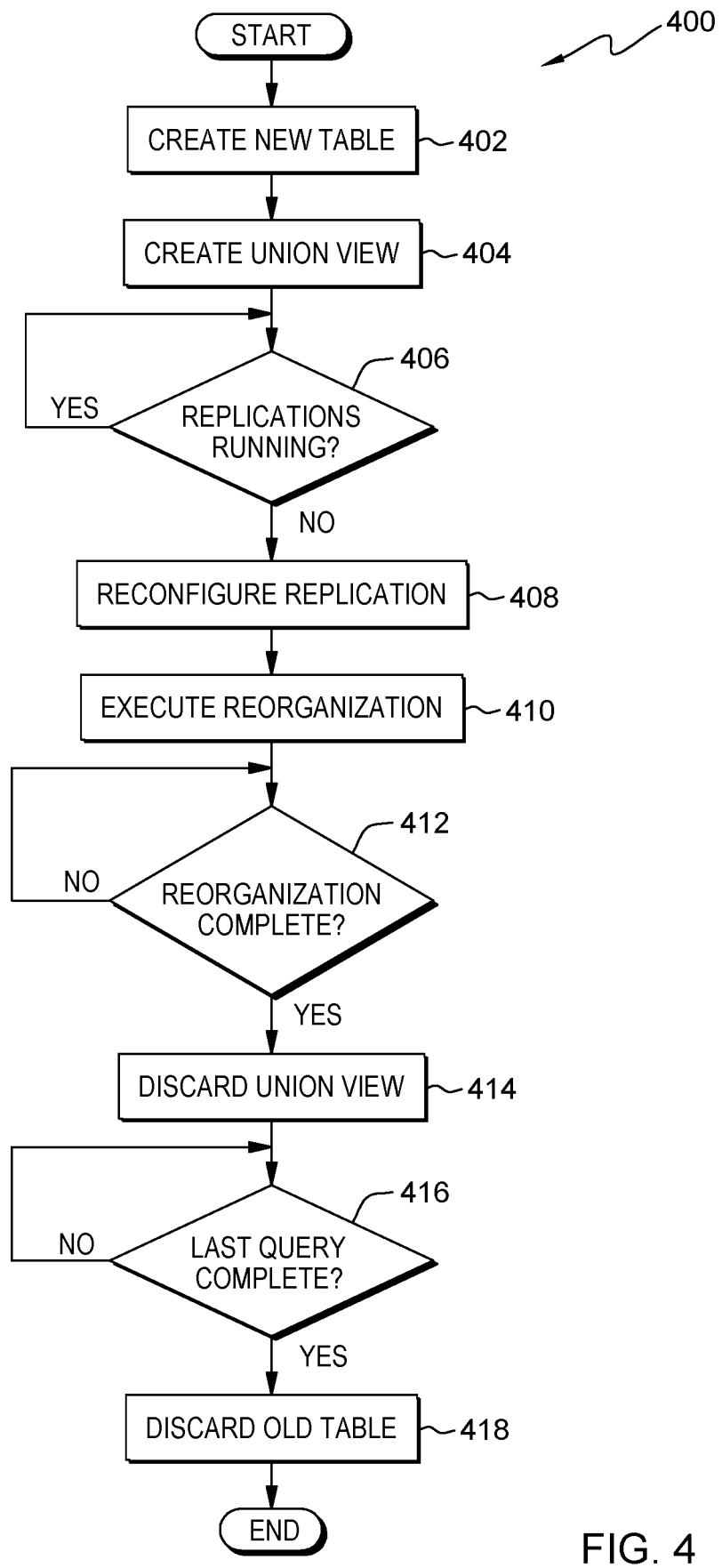
FIG. 4 is a flowchart depicting operational steps of the reorganization program, on a computing device within the distributed data processing environment of FIG. 1, for online reorganization of database tables with concurrent updates, in accordance with an embodiment of the present invention.

FIG. 4 is a flow chart diagram of workflow 400 depicting operational steps for reorganization program 112 for online reorganization of database tables with concurrent updates in accordance with at least one embodiment of the invention. In an alternative embodiment, the steps of workflow 400 may be performed by any other program while working with reorganization program 112. In an embodiment, reorganization program 112 creates a new table with the same schema as the old table. In an embodiment, reorganization program 112 creates a view from the union of the old table and the new table for the new queries. In an embodiment, if reorganization program 112 determines that any replications are running, then reorganization program 112 waits for any replications that are currently running to finish, since the replication cannot be switched from the old table to the new table during an ongoing replication. In an embodiment, if reorganization program 112 determines that no replications are running, then reorganization program 112 reconfigures the replication to allow queries to either access a frozen snapshot of the data or always access the current state of the data. In an embodiment, reorganization program 112 executes the reorganization using the configuration selected in the previous step. In an embodiment, if reorganization program 112 determines that the reorganization has not completed then reorganization program 112 remains in this step until the reorganization completes. In an embodiment, if reorganization program 112 determines that the reorganization has completed then reorganization program 112 discards the union view and frees up resources. In an embodiment, if reorganization program 112 determines that the last query is not complete then reorganization program 112 remains in this step until the last query completes. In an embodiment, if reorganization program 112 determines that the last query is complete then reorganization program 112 discards the old table.

It should be appreciated that embodiments of the present invention provide at least for online reorganization of database tables with concurrent updates. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Reorganization program 112 creates a new table (step 402). In an embodiment, reorganization program 112 creates a new table, for example new table 330 from FIG. 3, with the same schema as the old table, for example old table 310 from FIG. 3. In an embodiment, the new table has different distribution/organizing keys than the old table. In an embodiment, reorganization program 112 receives the distribution/organizing keys from the user requesting the reorganization.

Reorganization program 112 creates a union view (step 404). In an embodiment, reorganization program 112 creates a view from the union of the old table and the new table for the new queries. This union view has visibility into both the old table partitions and the new table partitions. In an embodiment, reorganization program 112 creates the union view from a union projection of both tables. In an embodiment, the union command combines the result set of two or more select statements with only distinct rows, i.e., potential duplicate rows caused by the intermediate copy are suppressed. In this way, rows that were already copied to the second table will only appear once in the view.

Reorganization program 112 determines if any replications are running (decision block 406). In an embodiment, if reorganization program 112 determines that any replications are running ("yes" branch, decision block 406), then reorganization program 112 waits for any currently running replication transactions to complete, since the replication cannot be switched from the old table to the new table during an ongoing replication transaction.

Reorganization program 112 reconfigures the replication (step 408). In an embodiment, if reorganization program 112 determines that no replications are running ("no" branch, decision block 406), then reorganization program 112 reconfigures the replication to allow queries to access a frozen snapshot of the data. In another embodiment, reorganization program 112 reconfigures the replication to always access the current state of the data.

In an embodiment, if a query shall not see any potential data modifications that occur concurrently to the reorganization, e.g., query Q1 from FIG. 2 which started before the reorganization started, then reorganization program 112 reconfigures the replication using a technique that allows queries to access a frozen snapshot of the data. In this technique, inserts are only applied to the new table that reorganization program 112 creates. Therefore, using the example from FIG. 2, query Q2 can access these new rows, but since they are not added to the old table, query Q1 is not aware of them. Deletes are applied to the new table directly. In the old table, the row is only marked as "logically deleted" and the union view uses that deletion marker to filter out the row. This prevents the deleted rows from showing in the result for query Q2 since query Q2 accesses the view, and not the old table directly. Q1 still sees the data because it ignores the marker during its predicate evaluation.

In another embodiment, if a query can always access the current state of the data, then reorganization program 112 reconfigures the replication using a technique that only operates on the old table. Therefore, using the example from FIG. 2, query Q1 is only operating on the old table. To guarantee that this query sees any data changes (i.e., insert, update, or delete), it is necessary to apply these changes to the old table as well as the new table into which the reorganized data is being copied. In this technique, it is important that query Q2 does not see any duplicated rows from the old and new table, and it must not see rows that were deleted. In an embodiment, reorganization program 112 guarantees this by using the following procedure. Deletes are applied simultaneously to both the old and the new tables simultaneously. In this way, the deletes are applied to both rows that were already copied to the new table as well as rows that are deleted while still waiting to be copied. Inserts are executed on both tables as well. Although queries accessing the data via the union view encounter both copies of that row, the semantics of the union operator removes one of the duplicates. Updates are broken into a delete followed by an insert. In this way, the rows are updated as described above. In an embodiment, reorganization program 112 automatically updates a transaction log to track each replication transaction on the old table so that these replication transaction can be applied to the new table. In an embodiment, once the replication transaction completes on the old table, reorganization program 112 executes the same replication transaction on the new table.

Each insert or delete statement executed by the replication engine becomes a more complex operation while the reorganization takes place. In various embodiments, reorganization program 112 uses several different approaches to implement the changes that are described in the following paragraphs.

In an embodiment, reorganization program 112 modifies the replication engine by informing the replication engine that a data reorganization is taking place. Therefore, instead of executing only one insert or one delete statement, it will now execute two inserts (one on the old table and one on the new table) and two deletes (one on the old table and one on the new table).

In another embodiment, reorganization program 112 uses 'instead of' triggers on the view. A decoupling between the reorganization functionality and the replication is achieved by always using a view on top of the table, and replication always operates on the view. When a reorganization starts, the view is redefined to become the union over the old table and the new table. Additionally, 'instead of' triggers are created on the view, which intercepts any insert or delete statement and instead executes one insert/delete on the old table and another insert/delete on the new table.

In yet another embodiment, reorganization program 112 uses asynchronous replay of data modifications, where reorganization maintains the old table only. In this technique, inserts and deletes are executed against the old table and committed. An asynchronous process detects all changes on the old table, for example by reading a transaction log that is automatically written, and then applies those changes to the new table. The benefit to this technique is that no performance impact occurs on the replication process because only one table is maintained. Consistency of the data across both tables, however, cannot be guaranteed because there is a time window in which the changes have been applied on the old table but not yet on the new table. For example, query Q2 from FIG. 2 would include new insertions (rows inserted by replication) already since they appear in the old table. But deletions may or may not be incorporated into the result set for Q2. If the affected rows were not yet copied by the reorganization to the new table when the deletion command is execute, the row will be gone from the old table. But if the row was already copied to the new table before the deletion on the old table occurs, the union semantics of the view pick the version of the row from the new table. Therefore, such an approach has to be chosen carefully and only with the knowledge about applications accessing this data.

Reorganization program 112 executes the reorganization (step 410). In an embodiment, reorganization program 112 executes the reorganization using the replication configuration selected in step 408.

Reorganization program 112 determines if the reorganization is complete (decision block 412). In an embodiment, if reorganization program 112 determines that the reorganization has not completed, ("no" branch, decision block 412), then reorganization program 112 remains in decision block 412 until the reorganization completes.

Reorganization program 112 discards the union view (step 414). In an embodiment, if reorganization program 112 determines that the reorganization has completed, ("yes" branch, decision block 412), then then the union view is no longer needed. Reorganization program 112 therefore discards the union view and frees up resources.

Reorganization program 112 determines if the last query is complete (decision block 416). In an embodiment, if reorganization program 112 determines that the last query is not complete, ("no" branch, decision block 416), then reorganization program 112 remains in decision block 416 until the last query completes. This is necessary since any running queries may still be accessing the old table.

Reorganization program 112 discards the old table (step 418). In an embodiment, if reorganization program 112 determines that the last query is complete, ("yes" branch, decision block 416), then the reorganization process is complete, and the old table is no longer needed. Reorganization program 112 therefore discards the old table.

Figure 5:
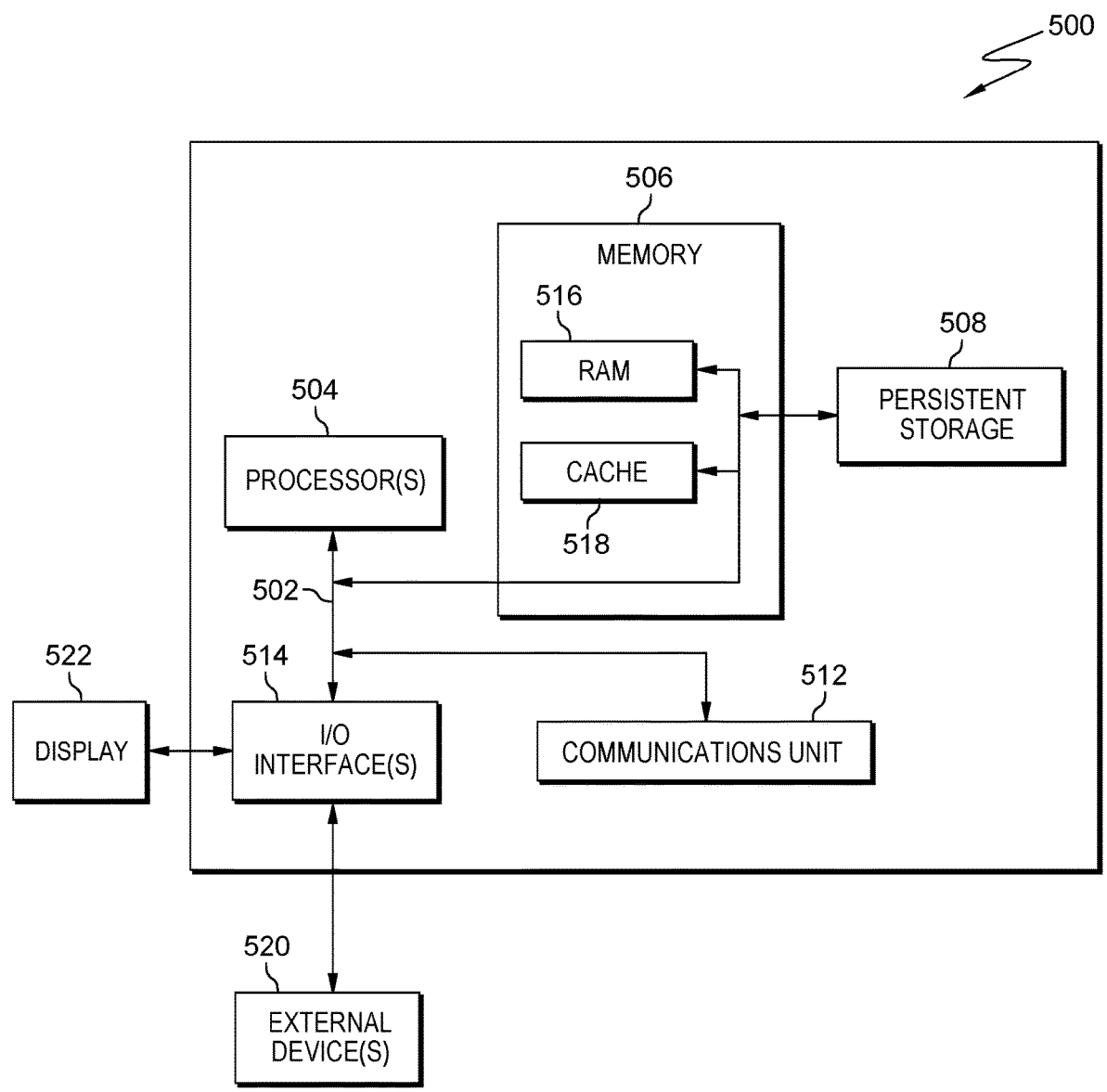
FIG. 5 depicts a block diagram of components of the computing devices executing the reorganization program within the distributed data processing environment of FIG. 1, in accordance with an embodiment of the present invention.

FIG. 5 is a block diagram depicting components of computing device 110 suitable for reorganization program 112, in accordance with at least one embodiment of the invention. FIG. 5 displays the computer 500, one or more processor(s) 504 (including one or more computer processors), a communications fabric 502, a memory 506 including, a random-access memory (RAM) 516, and a cache 518, a persistent storage 508, a communications unit 512, I/O interfaces 514, a display 522, and external devices 520. It should be appreciated that FIG. 5 provides only an illustration of one embodiment and does not imply any limitations with regard to the environments in which different embodiments may be implemented. Many modifications to the depicted environment may be made by those skilled in the art.

As depicted, the computer 500 operates over the communications fabric 502, which provides communications between the computer processor(s) 504, memory 506, persistent storage 508, communications unit 512, and input/output (I/O) interface(s) 514. The communications fabric 502 may be implemented with any architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a RAM 516 and a cache 518. In general, the memory 506 can include any suitable volatile or non-volatile computer readable storage media. Cache 518 is a fast memory that enhances the performance of processor(s) 504 by holding recently accessed data, and near recently accessed data, from RAM 516.

Program instructions for reorganization program 112 may be stored in the persistent storage 508, or more generally, any computer readable storage media, for execution by one or more of the respective computer processors 504 via one or more memories of the memory 506. The persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. In the context of some embodiments of the present invention, the source of the various input data may be physically remote to the computer 500 such that the input data may be received, and the output data similarly transmitted via the communications unit 512.

The I/O interface(s) 514 allows for input and output of data with other devices that may be connected to computer 500. For example, the I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present invention, e.g., reorganization program 112, can be stored on such portable computer readable storage media and can be loaded onto persistent storage 508 via the I/O interface(s) 514. I/O interface(s) 514 also connect to a display 522.

Display 522 provides a mechanism to display data to a user and may be, for example, a computer monitor. Display 522 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for database table reorganization, the computer-implemented method comprising:
   creating, by one or more computer processors, a second table, wherein the second table has a same schema as a first table;
   projecting, by the one or more computer processors, a union of the first table and the second table to create a view, wherein the view allows table data to be queried and modified while a database table reorganization is performed;
   responsive to one or more running replication transactions completing, executing, by the one or more computer processors, the database table reorganization;
   responsive to receiving an insert statement for the row, applying, by the one or more computer processors, the insert statement for the row to the second table only, wherein the query that is started after starting the reorganization can access the inserted rows, and further wherein the query that is started before starting the reorganization is not aware of the inserted rows; and
   responsive to receiving a query before completion of the database table reorganization, allowing, by the one or more computer processors, the query to access the view.

2. The computer-implemented method of claim 1, wherein the union of the first table and the second table combines a result set of at least two selection statements, wherein the at least two selection statements only select one or more distinct rows.

3. The computer-implemented method of claim 1, wherein responsive to the one or more running replication transactions completing, executing the database table reorganization further comprises:
   responsive to receiving a delete statement for a row, applying, by the one or more computer processors, the delete statement for the row to the second table; and
   marking, by the one or more computer processors, the row in the first table as logically deleted.

4. The computer-implemented method of claim 1, wherein responsive to the one or more running replication transactions completing, executing the database table reorganization further comprises:
   responsive to receiving an insert statement for a row, applying, by the one or more computer processors, the insert statement for the row to the first table and the second table;
   responsive to receiving a delete statement for the row, applying, by the one or more computer processors, the delete statement for the row to the first and the second table;
   responsive to receiving an update statement for the row, applying, by the one or more computer processors, the delete statement for the row to the second table followed by the insert statement for the row to the second table; and
   modifying, by the one or more computer processors, the view such that any queries accessing the row via the view only see the row in one of the tables.

5. The computer-implemented method of claim 1, wherein responsive to receiving the query, allowing the query to access the view further comprises:
   performing, by the one or more computer processors, an each replication transaction of one or more replication transactions by using the view, wherein the view creates one or more triggers to intercept the each replication transaction of one or more replication transactions; and
   applying, by the one or more computer processors, the each replication transaction to both the first table and the second table.

6. The computer-implemented method of claim 1, wherein responsive to receiving the query, allowing the query to access the view further comprises:
   performing, by the one or more computer processors, each replication transaction of one or more replication transactions by using the view;
   applying, by the one or more computer processors, each replication transaction of the one or more replication transactions to the first table only, wherein a transaction log tracks each replication transaction of the one or more replication transactions to the first table; and
   applying, by the one or more computer processors, each replication transaction of the one or more replication transactions to the second table based on the transaction log after completing each replication transaction of the one or more replication transactions to the first table.

7. The computer-implemented method of claim 1, wherein a replication engine is modified to allow one or more new replication transactions for the first table to be executed on both the first table and the second table.

8. A computer program product for database table reorganization, the computer program product comprising:
   one or more computer readable storage devices and program instructions stored on the one or more computer readable storage devices, the stored program instructions comprising:

create a second table, wherein the second table has a same schema as a first table;
project a union of the first table and the second table to create a view, wherein the view allows table data to be queried and modified while a database table reorganization is performed;
responsive to one or more running replication transactions completing, execute the database table reorganization;
responsive to receiving an insert statement for the row, apply the insert statement for the row to the second table only, wherein the query that is started after starting the reorganization can access the inserted rows, and further wherein the query that is started before starting the reorganization is not aware of the inserted rows; and
responsive to receiving a query before completion of the database table reorganization, allow the query to access the view.

9. The computer program product of claim 8, wherein the union of the first table and the second table combines a result set of at least two selection statements, wherein the at least two selection statements only select one or more distinct rows.

10. The computer program product of claim 8, wherein responsive to the one or more running replication transactions completing, execute the database table reorganization further comprises one or more of the following program instructions, stored on the one or more computer readable storage media, to:
responsive to receiving a delete statement for a row, apply the delete statement for the row to the second table; and
mark the row in the first table as logically deleted.

11. The computer program product of claim 8, wherein responsive to receiving the query, allow the query to access the view further comprises one or more of the following program instructions, stored on the one or more computer readable storage media, to:
responsive to receiving an insert statement for a row, apply the insert statement for the row to the first table and the second table;
responsive to receiving a delete statement for the row, apply the delete statement for the row to the first and the second table;
responsive to receiving an update statement for the row, apply the delete statement for the row to the second table followed by the insert statement for the row to the second table; and
modify the view such that any queries accessing the row via the view only see the row in one of the tables.

12. The computer program product of claim 8, wherein responsive to receiving the query, allow the query to access the view further comprises one or more of the following program instructions, stored on the one or more computer readable storage media, to:
perform an each replication transaction of one or more replication transactions by using the view, wherein the view creates one or more triggers to intercept the each replication transaction of one or more replication transactions; and
apply the each replication transaction to both the first table and the second table.

13. The computer program product of claim 8, wherein responsive to receiving the query, allow the query to access the view further comprises one or more of the following program instructions, stored on the one or more computer readable storage media, to:
perform each replication transaction of one or more replication transactions by using the view;
apply each replication transaction of the one or more replication transactions to the first table only, wherein a transaction log tracks each replication transaction of the one or more replication transactions to the first table; and
apply each replication transaction of the one or more replication transactions to the second table based on the transaction log after completing each replication transaction of the one or more replication transactions to the first table.

14. The computer program product of claim 8, wherein a replication engine is modified to allow one or more new replication transactions for the first table to be executed on both the first table and the second table.

15. A computer system for database table reorganization, the computer system comprising:
one or more computer processors;
one or more computer readable storage media; and
program instructions stored on the one or more computer readable storage media for execution by at least one of the one or more computer processors, the stored program instructions comprising:
create a second table, wherein the second table has a same schema as a first table;
project a union of the first table and the second table to create a view, wherein the view allows table data to be queried and modified while a database table reorganization is performed;
responsive to one or more running replication transactions completing, execute the database table reorganization;
to receiving an insert instruction for the row, apply the insert instruction for the row to the second table only, wherein the query that is started after starting the reorganization can access the inserted rows, and further wherein the query that is started before starting the reorganization is not aware of the inserted rows; and
responsive to receiving a query before completion of the database table reorganization, allow the query to access the view.

16. The computer system of claim 15, wherein the union of the first table and the second table combines a result set of at least two selection statements, wherein the at least two selection statements only select one or more distinct rows.

17. The computer system of claim 15, wherein responsive to the one or more running replication transactions completing, execute the database table reorganization further comprises one or more of the following program instructions, stored on the one or more computer readable storage media, to:
responsive to receiving a delete statement for a row, apply the delete instruction for the row to the second table; and
mark the row in the first table as logically deleted.

18. The computer system of claim 15, wherein responsive to receiving the query, allow the query to access the view further comprises one or more of the following program instructions, stored on the one or more computer readable storage media, to:
responsive to receiving an insert statement for a row, apply the insert statement for the row to the first table and the second table;
responsive to receiving a delete statement for the row, apply the delete statement for the row to the first and the second table;

responsive to receiving an update statement for the row, apply the delete statement for the row to the second table followed by the insert statement for the row to the second table; and modify the view such that any queries accessing the row via the view only see the row in one of the tables.

19. The computer system of claim 15, wherein responsive to receiving the query, allow the query to access the view further comprises one or more of the following program instructions, stored on the one or more computer readable storage media, to:

perform an each replication transaction of one or more replication transactions by using the view, wherein the view creates one or more triggers to intercept the each replication transaction of one or more replication transactions; and apply the each replication transaction to both the first table and the second table.

20. The computer system of claim 15, wherein responsive to receiving the query, allow the query to access the view further comprises one or more of the following program instructions, stored on the one or more computer readable storage media, to:

perform each replication transaction of one or more replication transactions by using the view;

apply each replication transaction of the one or more replication transactions to the first table only, wherein a transaction log tracks each replication transaction of the one or more replication transactions to the first table; and apply each replication transaction of the one or more replication transactions to the second table based on the transaction log after completing each replication transaction of the one or more replication transactions to the first table.

* * * * *